United States Patent
Goodman et al.

(10) Patent No.: US 11,526,865 B2
(45) Date of Patent: Dec. 13, 2022

(54) METHOD AND SYSTEM FOR CARDLESS ATM TRANSACTION VIA MOBILE DEVICE

(71) Applicant: Mastercard International Incorporated, Purchase, NY (US)

(72) Inventors: Daniel Jason Goodman, White Plains, NY (US); Max Alexander Belin, Pembroke Pines, FL (US); Michael Leung, Brooklyn, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 15/693,822

(22) Filed: Sep. 1, 2017

(65) Prior Publication Data
US 2018/0068297 A1     Mar. 8, 2018

Related U.S. Application Data

(60) Provisional application No. 62/383,446, filed on Sep. 4, 2016.

(51) Int. Cl.
*G06Q 20/32*     (2012.01)
*G06Q 40/02*     (2012.01)
(Continued)

(52) U.S. Cl.
CPC ... *G06Q 20/3221* (2013.01); *G06F 16/90335* (2019.01); *G06K 7/10722* (2013.01);
(Continued)

(58) Field of Classification Search
USPC ........................................................ 705/43
See application file for complete search history.

(56) References Cited

U.S. PATENT DOCUMENTS

| 5,963,647 A | 10/1999 | Downing et al. |
| 6,182,894 B1 | 2/2001 | Hackett et al. |

(Continued)

FOREIGN PATENT DOCUMENTS

| CN | 101882343 A | 11/2010 |
| CN | 103150649 A | 6/2013 |

(Continued)

OTHER PUBLICATIONS

Notification of Transmittal of the International Search Report and the Written Opinion of the International Searching Authority (Forms PCT/ISA/220, PCT/ISA/210 and PCT/ISA/237) dated Nov. 8, 2017, by the European Patent Office in corresponding International Application No. PCT/US2017/049544. (14 pages).

(Continued)

*Primary Examiner* — Ambreen A. Alladin
(74) *Attorney, Agent, or Firm* — Panitch Schwarze Belisario & Nadel LLP

(57) ABSTRACT

A method for initiating a cardless automated teller machine (ATM) transaction via a mobile computing device includes: storing, in a memory of a mobile computing device, at least transaction account data and authentication data; receiving, by an input device of the mobile computing device, at least desired transaction data and authentication information; receiving, by the input device of the mobile computing device, a unique identifier associated with an automated teller machine (ATM); authenticating, by an authentication module of the mobile computing device, the received authentication information based on the stored authentication data; and electronically transmitting, by a transmitting device of the mobile computing device, at least the received desired data and unique identifier and a result of the authentication to an external computing system.

10 Claims, 8 Drawing Sheets

(51) Int. Cl.
    *G06Q 20/10*     (2012.01)
    *G06F 16/903*     (2019.01)
    *G06K 7/10*     (2006.01)
    *G06Q 20/38*     (2012.01)
    *G06Q 20/40*     (2012.01)

(52) U.S. Cl.
    CPC ......... *G06Q 20/1085* (2013.01); *G06Q 20/32* (2013.01); *G06Q 20/3825* (2013.01); *G06Q 20/401* (2013.01); *G06Q 40/02* (2013.01)

(56) References Cited

U.S. PATENT DOCUMENTS

| | | | |
|---|---|---|---|
| 8,556,164 | B1 | 10/2013 | Freedman et al. |
| 8,725,640 | B2 | 5/2014 | Mateo Delgado et al. |
| 9,418,358 | B2 | 8/2016 | Johnson et al. |
| 10,013,684 | B2 | 7/2018 | Keys et al. |
| 10,255,588 | B2 | 4/2019 | Singhal |
| 10,275,827 | B2 | 4/2019 | McCarthy et al. |
| 10,535,047 | B1* | 1/2020 | Thomas ............... G06Q 20/326 |
| 2002/0026426 | A1 | 2/2002 | Bennett |
| 2004/0039702 | A1 | 2/2004 | Blair et al. |
| 2005/0113137 | A1 | 5/2005 | Rodriguez et al. |
| 2006/0206709 | A1* | 9/2006 | Labrou ............... G06Q 20/18 713/167 |
| 2009/0078758 | A1 | 3/2009 | Crowell |
| 2011/0137795 | A1 | 6/2011 | Nambiar et al. |
| 2011/0238573 | A1* | 9/2011 | Varadarajan ....... G06Q 20/1085 705/43 |
| 2012/0160912 | A1* | 6/2012 | Laracey ............. G06Q 20/3274 235/379 |
| 2012/0226610 | A1 | 9/2012 | Gill et al. |
| 2014/0108249 | A1 | 4/2014 | Kulpati et al. |
| 2015/0199671 | A1* | 7/2015 | Bajaj ....................... G07F 19/20 705/39 |
| 2016/0019537 | A1 | 1/2016 | Raja et al. |
| 2016/0104146 | A1 | 4/2016 | Peyton et al. |
| 2016/0162869 | A1 | 6/2016 | Gupta et al. |
| 2016/0358139 | A1 | 12/2016 | Keys et al. |
| 2017/0124544 | A1* | 5/2017 | Recriwal ............. G06Q 20/326 |
| 2017/0262823 | A1 | 9/2017 | Hartung |
| 2018/0005206 | A1 | 1/2018 | Belin et al. |
| 2021/0319672 | A1 | 10/2021 | Kim |
| 2022/0051210 | A1 | 2/2022 | Phillips et al. |

FOREIGN PATENT DOCUMENTS

| | | |
|---|---|---|
| CN | 203299885 U | 11/2013 |
| WO | 2015/054697 A1 | 4/2015 |
| WO | 2015/084755 A1 | 6/2015 |
| WO | 2015/172150 A1 | 11/2015 |
| WO | 2016/089629 A1 | 6/2016 |

OTHER PUBLICATIONS

Office Action dated Jun. 8, 2020, by the Canadian Intellectual Property Office in corresponding Canadian Patent Application No. 3,024,885. (5 pages).

Office Action dated Apr. 29, 2021, by the Canadian Intellectual Property Office in corresponding Canadian Patent Application No. 3,024,885 (5 pages).

Office Action (Communication pursuant to Article 94(3) EPC) dated May 19, 2021, by the European Patent Office in corresponding European Patent Application No. 17 768 299.4-1222. (8 pages).

Written Opinion dated Jun. 21, 2021, by the Intellectual Property Office of Singapore in corresponding Singapore Patent Application No. 11201809689V. (6 pages).

Hamblen, Matt , "A Short history of NFC", Computerworld,, Dec. 19, 2012, (5 pages).

Non-Final Office Action issued by the U.S. Patent and Trademark Office in the U.S. Appl. No. 15/633,935, dated Mar. 17, 2022, U.S. Patent and Trademark Office, Alexandria, VA. (17 pages).

Non-Final Office Action issued by the U.S. Patent and Trademark Office in the U.S. Appl. No. 16/671,333, dated Jan. 27, 2022, U.S. Patent and Trademark Office, Alexandria, VA. (52 pages).

Office Action (First Office Action) dated Oct. 8, 2022, by the China National Intellectual Property Adminstration in corresponding Chinese Patent Application No. 20170053983.7 and an English Translation of the Office Action. (21 pages).

* cited by examiner

METHOD AND SYSTEM FOR CARDLESS ATM TRANSACTION VIA MOBILE DEVICE

FIELD

The present disclosure relates to the initiation and processing of transactions at an automated teller machine (ATM), specifically the initiation of a transaction at an ATM that is initiated via a mobile computing device and that is performed without the presentation of a payment card to the ATM.

BACKGROUND

Traditionally, automated teller machines (ATMs) require the insertion or other type of presentation of a physical payment card in order to be used. Traditional ATMs operate by reading transaction account details from the payment card, and then contacting an appropriate payment network for the processing of a transaction using that payment card. However, the use of a physical payment card presents opportunities for theft of the payment card and/or the skimming of the account details stored therein.

In some cases, ATMs have been configured to interface with mobile computing devices for receipt of the transaction details therefrom, such as via near field communication to receive payment credentials from an electronic wallet stored in the mobile computing device. While such methods do not require the use of a physical payment card, thus reducing the potential for theft of the physical card, such methods are often more susceptible to skimming. For instance, because the mobile computing device is actively transmitting payment credentials for the exchange, there is a greater potential for the use of a device to skim the payment credentials therefrom. In addition, such methods also often require near field communication capability in the mobile device, which may be unavailable or expensive to implement.

Some systems have been developed that enable the withdrawal of funds at an ATM without the use of a physical payment card, such as described in U.S. Provisional Patent Application No. 62/356,104, entitled "Method and System for Cardless Disbursement from an Automated Teller Machine," filed on Jun. 29, 2016, which is herein incorporated by reference in its entirety. However, such systems do not enable the individual that desires the funds to specify the transaction details; rather, the individual receives a message that funds are available for withdrawal and is provided a unique code to accomplish that withdrawal for entry into the ATM.

Thus, there is a need for a technical solution whereby an ATM may be used for traditional transactions related thereto while being configured to operate entirely "cardless," without the presentation of a payment card directly to the ATM by the individual attempting a transaction.

SUMMARY

The present disclosure provides a description of systems and methods for the initiation and processing of a cardless automated teller machine (ATM) transaction via a mobile computing device. The mobile computing device is used for input of the desired transaction details, and receives a unique identifier from the ATM that is intended for use for the transaction. This information, along with authentication of the user, is provided to a third party computing system that is configured to release the necessary transaction account details to the specified ATM via a secure communication channel, such that the ATM may be able to use transaction account details in traditional methods, but without requiring the user to present a payment card to the ATM.

A method for initiating a cardless automated teller machine (ATM) transaction via a mobile computing device includes: storing, in a memory of a mobile computing device, at least transaction account data and authentication data; receiving, by an input device of the mobile computing device, at least desired transaction data and authentication information; receiving, by the input device of the mobile computing device, a unique identifier associated with an automated teller machine (ATM); authenticating, by an authentication module of the mobile computing device, the received authentication information based on the stored authentication data; and electronically transmitting, by a transmitting device of the mobile computing device, at least the received desired data and unique identifier and a result of the authentication to an external computing system.

A method for processing a cardless automated teller machine (ATM) transaction initiated by a mobile computing device includes: storing, in an automated teller machine (ATM) database of a processing server, a plurality of ATM profiles, wherein each ATM profile is a structured data set related to an ATM including at least an ATM identifier and communication data; storing, in an account database of the processing server, a plurality of account profiles, wherein each account profile is a structured data set related to a transaction account including at least an account identifier and a tokenized primary account number; receiving, by a receiving device of the processing server, a transaction request via a first communication channel, wherein the transaction request includes at least a specific account identifier, a specific ATM identifier, transaction data, and an indication of successful authentication; executing, by a querying module of the processing server, a query on the ATM database to identify a specific ATM profile where the included ATM identifier corresponds to the specific ATM identifier; executing, by the querying module of the processing server, a query on the account database to identify a specific account profile where the included account identifier corresponds to the specific account identifier; electronically transmitting, by a transmitting device of the processing server, at least the received transaction data and the tokenized primary account number included in the identified specific account profile to the ATM related to the identified specific ATM profile based on the communication data included in the specific ATM profile via a second communication channel.

A system for initiating a cardless automated teller machine (ATM) transaction via a mobile computing device includes: a memory of a mobile computing device configured to store at least transaction account data and authentication data; an input device of the mobile computing device configured to receive at least desired transaction data and authentication information, and a unique identifier associated with an automated teller machine (ATM); an authentication module of the mobile computing device configured to authenticate the received authentication information based on the stored authentication data; and a transmitting device of the mobile computing device configured to electronically transmit at least the received desired data and unique identifier and a result of the authentication to an external computing system.

A system for processing a cardless automated teller machine (ATM) transaction initiated by a mobile computing device includes: an automated teller machine (ATM) database of a processing server configured to store a plurality of ATM profiles, wherein each ATM profile is a structured data set related to an ATM including at least an ATM identifier and communication data; an account database of the processing server configured to store a plurality of account profiles, wherein each account profile is a structured data set related to a transaction account including at least an account identifier and a tokenized primary account number; a receiving device of the processing server configured to receive a transaction request via a first communication channel, wherein the transaction request includes at least a specific account identifier, a specific ATM identifier, transaction data, and an indication of successful authentication; a querying module of the processing server configured to execute a query on the ATM database to identify a specific ATM profile where the included ATM identifier corresponds to the specific ATM identifier, and a query on the account database to identify a specific account profile where the included account identifier corresponds to the specific account identifier; and a transmitting device of the processing server configured to electronically transmit at least the received transaction data and the tokenized primary account number included in the identified specific account profile to the ATM related to the identified specific ATM profile based on the communication data included in the specific ATM profile via a second communication channel.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
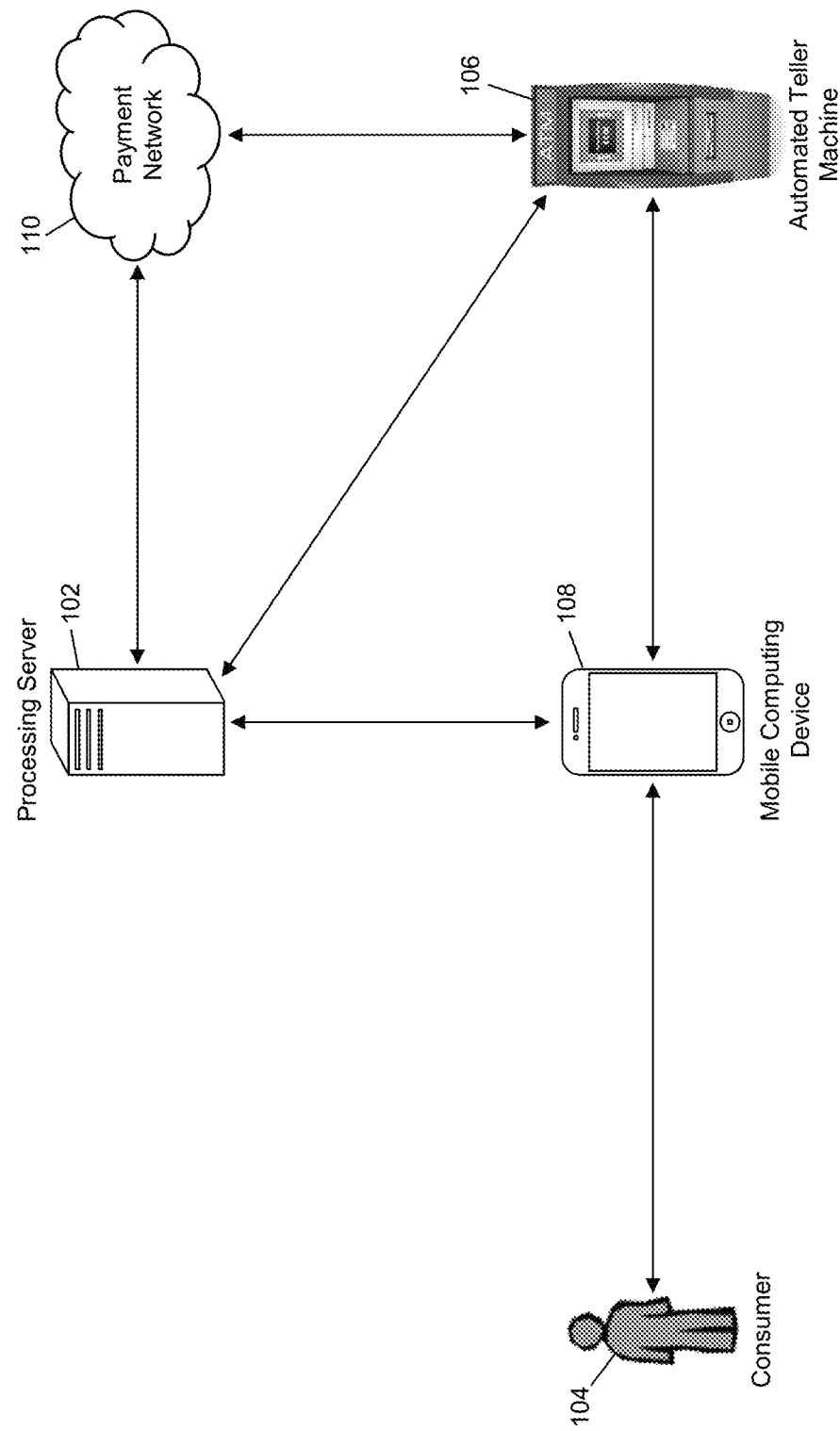
FIG. 1 is a block diagram illustrating a high level system architecture for the initiation and processing of a cardless automated teller machine transaction via a mobile computing device in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

System for Cardless Automated Teller Machine Transactions

FIG. 1 illustrates a system 100 for the initiation and processing of cardless transactions at an automated teller machine that are initiated via a mobile computing device and processed using a third party processing server.

The system 100 may include a processing server 102. The processing server 102, discussed in more detail below, may be configured to process payment transactions for consumers 104 originating from automated teller machines (ATMs) 106 that are initiated via a mobile computing device 108 that are initiated without the presentation of a payment card to the ATM 106. In the system 100, a consumer 104 may have a transaction account associated therewith that is enabled for use with ATM transactions, such as for the withdrawal of funds, deposit of funds, inquiry of account balances, etc. The transaction account may be issued to the consumer 104 by an issuing financial institution or other suitable type of entity configured to issue transaction accounts that are suitable for ATM 106 usage.

Transaction details for the transaction account may be stored in the processing server 102. The transaction details may include at least a primary account number and any other payment credentials that may be necessary for inclusion in a payment transaction for use in the authorization and approval thereof, such as a name, security code, payment cryptogram, transaction counter, expiration date, etc. In some embodiments, the processing server 102 may be configured to tokenize primary account numbers and other account identifiers (e.g., bank account numbers) for use in performing the functions discussed herein, such that a detokenized primary account number may not be provided to an ATM 106 as part of the processes discussed herein.

The consumer 104 may possess a mobile computing device 108 for use in initiating cardless transactions with the ATM 106. The mobile computing device 108, discussed in more detail below, may be any type of device suitable for performing the functions discussed herein, such as a cellular phone, smart phone, smart watch, wearable computing device, implantable computing device, tablet computer, notebook computer, laptop computer, etc. In some embodiments, the functions of the mobile computing device 108 discussed herein may be performed via an application program stored in and executed by the mobile computing device 108, which may be a specially configured application program configured to cause the hardware components of the mobile computing device 108 to perform the functions discussed herein.

When the consumer 104 wishes to initiate a transaction at the ATM 106, such as for the withdrawal of funds, the consumer 104 may input their desired transaction details into the mobile computing device 108 (e.g., via the application program) using a suitable input device. Transaction details may include, for instance, an indication of the transaction account to be used, the amount of funds desired, the currency of the desired funds, denominations of the desired funds, etc. As part of the entry of the transaction details, the consumer 104 may be required to provide authentication information. The mobile computing device 108 may be configured to authenticate the consumer 104 prior to initiating the cardless ATM transaction. In some instances, the consumer 104 may provide authentication data upon registration of the transaction account with the application program for use in the functions discussed herein. For example, the registration of a transaction account may require the consumer 104 to provide proof of authorization for usage of the transaction account using any suitable method, and, upon being authenticated as an authorized user of the transaction account, may be requested to present data for use in future authentications on the mobile computing device 108. Authentication data may include, for example, a username, password, personal identification number, fingerprint, retinal scan, facial scan, vocal command, etc. In some instances, the authentication data may be passive information, such as details associated with the mobile computing device 108 that may be provided without requiring input by the consumer 104, such as a browser fingerprint, device identifier, geographic location, physical orientation of the mobile computing device 108, etc. In some cases, a combination of active and passive authentication data may be used. The mobile computing device 108 may store the authentication data, which may be used to authenticate the consumer 104 when attempting to initiate a new cardless transaction at an ATM 106. In some embodiments, the ATM 106 may be configured to perform additional authentication, such as using traditional methods (e.g., entry of a personal identification number or passcode). In other embodiments, the ATM 106 may accept the authentication performed by the mobile computing device 108 in place of performing its own authentication.

In some embodiments, the processing server 102 may receive the authentication data during the registration process, which may be stored therein as part of the transaction account data. In such embodiments, the processing server 102 may also be configured to authenticate the consumer 104 as part of the processing of the cardless ATM transaction. In some cases, the mobile computing device 108 may be configured to generate a digital signature upon successful authentication, where the processing server 102 may be configured to verify the digital signature as part of the authentication of the consumer 104 and transaction. For example, the mobile computing device 108 may possess a private key of a key pair, which may be used to generate the digital signature, where the processing server 102 may possess the corresponding public key for use in verifying the digital signature.

In addition to the receipt of the desired transaction details and consumer's authentication information, a unique identifier associated with the ATM 106 intended for use in the transaction may also be input to the mobile computing device 108. In one embodiment, the ATM 106 may be configured to display a unique identifier, such as an alphanumeric code, on a display device. The consumer 104 may read the unique identifier and manually input the identifier into the mobile computing device 108 using a suitable input device, such as a keyboard, touch screen, microphone, etc. In another embodiment, the automated teller machine 106 may be configured to generate and display a machine-readable code (e.g., bar code, quick response code, etc.) that is encoded with the unique identifier. In such an embodiment, the mobile computing device 108 may include an optical imager configured to read the machine-readable code, which may be decoded by the mobile computing device 108 to identify the unique identifier encoded therein. In one embodiment, the ATM 106 may electronically transmit the unique identifier to the mobile computing device 108, such as via near field communication, radio frequency, Bluetooth, local area network, audio signal, light signal, optically, or other suitable method.

In some cases, the unique identifier may be a value uniquely associated with the specific ATM 106. In such cases, the processing server 102 may possess the unique identifier associated with each ATM 106 for use in verifying the ATM 106 at which a desired transaction is to be initiated. In these cases, the unique identifier may be, for instance, an identification number, global positioning system coordinate of the ATM 106, internet protocol or media access control address of the ATM 106, etc. In other cases, the unique identifier may be unique to the intended transaction. In such a case, the ATM 106 may be configured to generate the unique identifier upon receipt of an instruction by the consumer 104, such as indicating a desire for a cardless transaction. The ATM 106 may be configured to generate a new unique identifier each time a consumer 104 wishes to conduct a cardless transaction at the ATM 106. In such cases, the ATM 106 may be configured to electronically transmit the unique identifier to the processing server 102 using a secure communication channel therewith, for use in verification. In some instances, the processing server 102 may be configured to generate the unique identifier and transmit the identifier to the ATM 106 for display to the consumer 104, such as upon a request received from the ATM 106 (e.g., after the consumer 104 has input the instruction) or from the mobile computing device 108 (e.g., before or with desired transaction details). In some embodiments, the mobile computing device 108 may be configured to provide transaction details or other related information to the ATM 106 or to the processing server 102 acting on behalf of the ATM 106 prior to executing the transaction, to identify if the ATM 106 supports such a transaction. For instance, only some ATMs 106 may be configured to enable withdrawals using the methods discussed herein, where the mobile computing device 108 may be configured to check the capabilities of an ATM 106 prior to proceeding with the transaction accordingly.

After entry of the desired transaction details, authentication information, and unique identifier, the mobile computing device 108 may electronically transmit the data to the processing server 102 using a first communication channel. In some instances, the transaction details may be entered prior to receipt/entry of the unique identifier. In these instances, there may be a period of validity during which the unique identifier must be entered. The period of validity may be set by the issuing institution associated with the transaction account, the processing server 102, or other suitable entity. In other instances, the unique identifier may be received by the mobile computing device 108 or entered therein prior to entry of the transaction details. The communication channel may be any type of communication channel suitable for performing the functions discussed herein, such as via a cellular communication network, the Internet, etc. The processing server 102 may receive the data from the mobile computing device 108, and may perform any necessary authentication or verification. Authentication may include authenticating any authentication data provided by the consumer 104 or verifying a digital signature provided as proof of authentication performed by the mobile computing device 108, as well as verification of the unique identifier associated with the ATM 106 that is to be used in the transaction.

In some embodiments, the consumer 104 may be provided with financial information associated with costs incurred by proceeding with the transaction prior to providing authentication information or other information that would initiate the processing of the transaction. For instance, a withdrawal may be subject to ATM fees, issuer fees, acquirer fees, exchange fees, etc. that may affect the consumer's decision to proceed with the transaction. In such cases, the ATM 106 and/or processing server 102 may be configured to provide such data to the consumer 104 either via the ATM 106 or mobile computing device 108.

In some embodiments, a unique identifier may be valid for only a predetermined period of time following generation and/or distribution to the mobile computing device 108. For instance, a unique identifier generated for a single transaction or that is unique associated with an ATM 106 may have a validity period associated therewith, where the unique identifier must be used in that validity period for successful authentication. In such embodiments, the validity period may be set by the processing server, the ATM 106, or other entity (e.g., an issuing financial institution). For example, the validity period may be one hour, one day, one week, etc. In some instances, the validity period of the unique identifier may be different from a validity period for authentication of the transaction. For instance, in one example, the consumer 104 may have only thirty seconds to enter the unique identifier associated with the ATM 106, but may have three minutes to authenticate themselves and/or the transaction.

Upon successful authentication, the processing server 102 (e.g., or other system and/or entity on behalf of the processing server 102) may electronically transmit transaction data to the ATM 106 (e.g., identified via the unique identifier supplied by the mobile computing device 108). The transaction data may include a tokenized primary account number for the transaction account indicated by the consumer 104 in the transaction details. In some embodiments, the processing server 102 may identify a previously-tokenized version of the primary account number. In other embodiments, the processing server 102 may tokenize the primary account number following receipt of the request from the mobile computing device 108. Methods for the tokenization of an account number will be apparent to persons having skill in the relevant art. In other embodiments, the mobile computing device 108 may be configured to store the primary account number (e.g., and additional payment credentials, if applicable), such as via an electronic wallet application program stored therein. In such embodiments, the account identifying information transmitted to the processing server 102 by the mobile computing device 108 may include the primary account number and other payment credentials, such as in a payment token. The processing server 102 may then tokenize (e.g., further, if provided with a payment token) the payment credentials provided by the mobile computing device 108. In such instances, the methods discussed herein may operate regardless of the origination of the payment credentials received at the processing server 102. In some instances, the processing server 102 may tokenize a different identification value for the transaction account in place of the primary account number, such as the bank account number.

In some embodiments, a virtual card number may be used in place of and/or in addition to a tokenized primary account number. For instance, in one example, the consumer 104 may identify a transaction account for which a virtual card number is used, which may be supplied to the ATM 106 via the mobile computing device 108. In such an example, the ATM 106 may supply the virtual card number to the payment network 110, which may identify a corresponding real account number (e.g., via mapping), which may be used in the processing of the transaction. In another example, the mobile computing device 108 may be provisioned with a tokenized virtual card number, which may be mapped to a virtual card number, which in turn may be mapped to a real account number. In such an example, additional entities and/or systems may be used in the processing of the transaction (e.g., a first system may map the tokenized virtual card number to the virtual card number, while a second system may map the virtual card number to the real account number).

The transaction data may be electronically transmitted using a second communication channel, which may utilize the same communication method as the mobile computing device 108 and processing server 102, or may be a separate communication method. In an exemplary embodiment, the second communication channel may be separate from the payment rails used by the ATM 106 for submission of transactions for processing. The ATM 106 may receive the transaction data, which may include the desired transaction details (e.g., without any account identifying information) and the tokenized primary account number. The ATM 106 may then initiate the transaction using traditional methods related thereto, using the tokenized primary account number in place of the traditional reading of primary account number read from a payment card presented to the ATM 106.

As part of the traditional process, the ATM 106 may submit the transaction data to a payment network 110 for processing thereby. The transaction data may be submitted via a third communication channel, which may be separate from the communication channel used for communications between the processing server 102 and the ATM 106, such as the payment rails associated with the payment network 110. The payment network 110 may receive a transaction message for the transaction, which may be generated by and submitted directly from the ATM 106, or another entity operating on behalf of the ATM 106, such as a financial institution or gateway processor.

The transaction message may be a specially formatted data message formatted pursuant to one or more standards governing the exchange of financial transaction messages, such as the International Organization of Standardization's ISO 8583 or ISO 20022 standards. A transaction message may include a message type indicator indicating a type thereof, such as an authorization request or response, and may also include a plurality of data elements configured to store the transaction data. For instance, the transaction message submitted by the ATM 106 may be an authorization request that includes at least a first data element configured to store the tokenized primary account number and additional data elements configured to store the additional transaction data (e.g., currency type, withdrawal amount, transaction type, transaction time, transaction date, geographic location, etc.).

The payment network 110 may receive the authorization request from the ATM 106, or from the processing server 102 acting on behalf of the ATM 106, and may process the transaction using traditional methods and systems. Additional detail regarding the traditional processing of payment transactions is discussed in more detail below with respect to the process 700 illustrated in FIG. 7. As part of the processing of the payment transaction, the authorization request may be forwarded to the processing server 102, such as via the payment rails associated with the payment network 110. The processing server 102 may be configured to detokenize the primary account number or otherwise identify the detokenized primary account number for the transaction account and replace the tokenized primary account number with the detokenized counterpart in the first data element included in the authorization request. The authorization request may then be forwarded (e.g., by the processing server 102 or the payment network 110) to the issuing financial institution associated with the transaction account for authorization thereby. In some embodiments, the processing server 102 may be a part of the payment network 110 and may receive the authorization request via internal communication methods thereof.

Upon a successful authorization, the ATM 106 may then dispense the desired funds to the consumer 104 or otherwise finalize the transaction that was desired by the consumer 104 based on the details input into their mobile computing device 108. As a result, the consumer 104 may initiate an ATM transaction using their mobile computing device 108 that does not require the presentation of any payment card to the ATM 106 or transmission of any data from the mobile computing device 108 to the ATM 106. Furthermore, the transaction may be any type of transaction desired by the consumer 104, enabling them to specify the transaction details using their mobile computing device 108. As a result, the processing server 102 and mobile computing device 108, as discussed herein, may provide for convenient and secure customized ATM transactions conducted without the presentation of a payment card.

Processing Server

Figure 2:
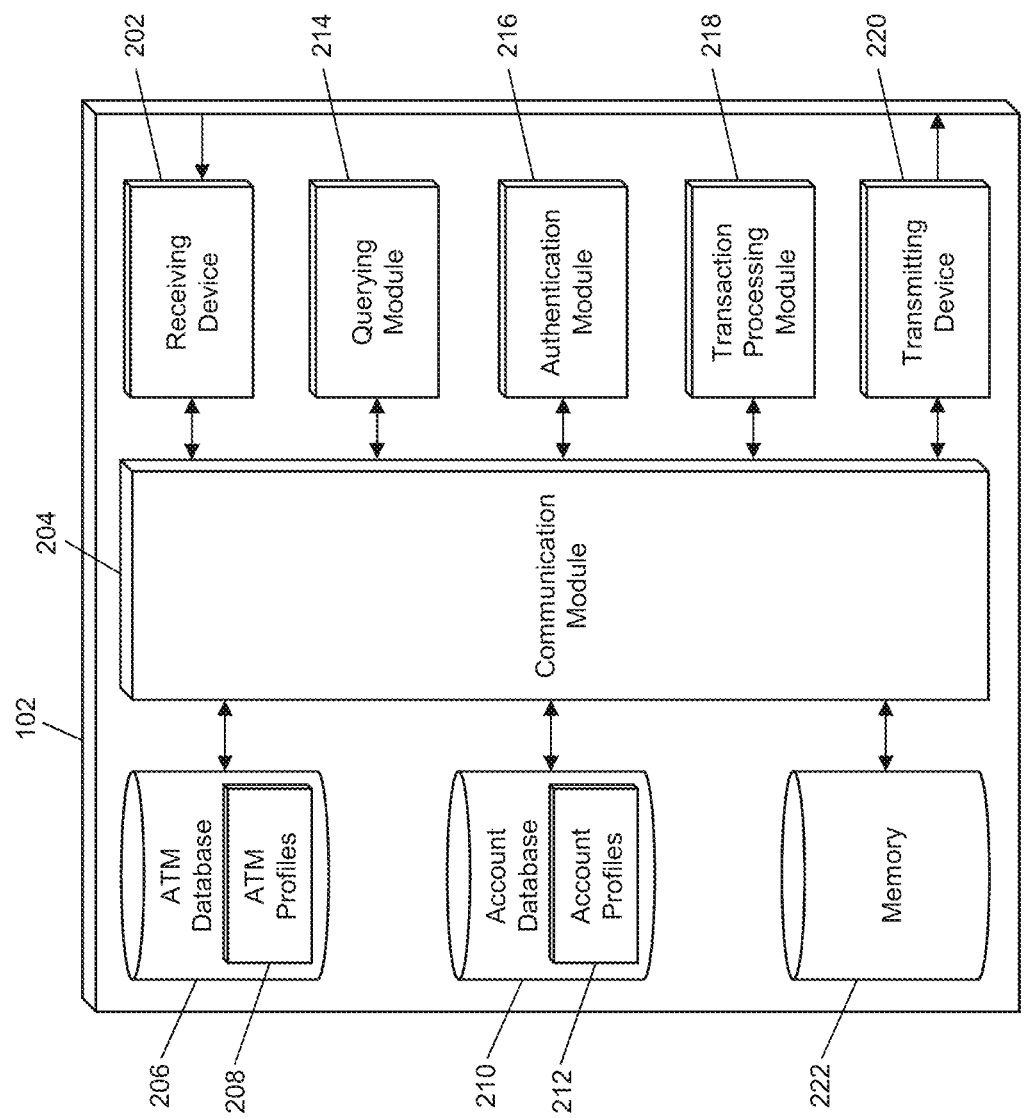
FIG. 2 is a block diagram illustrating the processing server of FIG. 1 for the processing of a cardless automated teller machine transaction in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 800 illustrated in FIG. 8 and discussed in more detail below may be a suitable configuration of the processing server 102.

The processing server 102 may include a receiving device 202. The receiving device 202 may be configured to receive data over one or more networks via one or more network protocols. In some embodiments, the receiving device 202 may be configured to receive data from ATMs 106, mobile computing devices 108, payment networks 110, and other entities via one or more communication networks, such as local area networks, cellular communication networks, the Internet, etc. The receiving device 202 may also be configured to receive data over specially configured payment rails associated with the payment network 110, which may be specialized infrastructure associated therewith. In some embodiments, the receiving device 202 may be comprised of multiple devices, such as different receiving devices for receiving data over different networks, such as a first receiving device for receiving data via the payment network 110 and a second receiving device for receiving data over the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by mobile computing devices 108, which may be superimposed or otherwise encoded with a transaction request. The transaction request may include desired transaction details, transaction account identifying information, authentication information and/or a digital signature, and a unique identifier associated with an ATM 106. The receiving device 202 may also be configured to receive transaction messages from the payment network 110 for processing thereof, such as the detokenization of a primary account number stored therein. In some embodiments, the receiving device 202 may be further configured to receive data signals electronically transmitted by the ATM 106, which may be transmitted using a communication channel separate from the payment rails, and may be superimposed or otherwise encoded with a unique identifier, such as for use in verifying the ATM 106 as one intended in a received transaction request.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 214, authentication module 216, transaction processing module 218, etc. As used herein, the term "module" may be software or hardware particularly programmed to receive an input, perform one or more processes using the input, and provide an output. The input, output, and processes performed by various modules will be apparent to one skilled in the art based upon the present disclosure.

The processing server 102 may include an ATM database 206. The ATM database 206 may be configured to store a plurality of ATM profiles 208 using a suitable data storage format and schema. The ATM database 206 may be a relational database that utilizes structured query language for the storage, identification, modifying, updating, accessing, etc. of structured data sets stored therein. Each ATM profile 208 may be a structured data set configured to store data related to an ATM 106. The ATM profile 208 may include at least the unique identifier associated with an ATM 106. In instances where ATMs 106 may generate unique identifiers for each transaction, the ATM profile 208 may include an identifier associated with the related ATM 106 in addition to unique identifiers received from the ATM 106. The ATM profile 208 may also include communication data used for transmitting data to the related ATM 106, such as a communication address.

The processing server 102 may include an account database 210. The account database 210 may be configured to store a plurality of account profiles 212 using a suitable data storage format and schema. The account database 210 may be a relational database that utilizes structured query language for the storage, identification, modifying, updating, accessing, etc. of structured data sets stored therein. Each account profile 212 may be a structured data set configured to store data related to a transaction account configured for use in ATM transactions. Each account profile 212 may include at least an account identifier and a primary account number. The account identifier may be any type of unique value suitable for identifying the account profile 212, such as a registration number, username, e-mail address, telephone number, etc. In some instances, the primary account number may be tokenized. In some embodiments, the account profile 212 may also include authentication data, a public key, or other data used in verifying authentication information or a result associated therewith provided in a transaction request.

The processing server 102 may include a querying module 214. The querying module 214 may be configured to execute queries on databases to identify information. The querying module 214 may receive one or more data values or query strings, and may execute a query string based thereon on an indicated database, such as the ATM database 206, to identify information stored therein. The querying module 214 may then output the identified information to an appropriate engine or module of the processing server 102 as necessary. The querying module 214 may, for example, execute a query on the ATM database 206 to identify an ATM profile 208 related to an ATM 106 intended for use based on the unique identifier included in a received transaction request, or a query on the account database 210 to identify an account profile 212 associated with a transaction request based on the account identifier included therein.

The processing server 102 may also include an authentication module 216. The authentication module 216 may be configured to perform authentications and verifications for the processing server 102 as discussed herein. The authentication module 216 may receive data to be authenticated or verified as input, may perform the authentication or verification, and output a result to another module or engine of the processing server 102. For example, the authentication module 216 may be configured to verify a digital signature included in a received transaction request using a public key stored in an account profile 212 associated with the transaction request, such as may be identified via a query executed on the account database 210 by the querying module 214. In another example, the authentication module 216 may be configured to verify a unique identifier included in a transaction request as corresponding to an ATM 106 at which a transaction related to the transaction request may be processed.

The processing server 102 may also include a transaction processing module 218. The transaction processing module 218 may be configured to perform the functions of the processing server 102 related to the processing of payment transactions as discussed herein. For example, the transaction processing module 218 may be configured to tokenize and detokenize primary account numbers using traditional methods. The transaction processing module 218 may also be configured to modify transaction messages, such as by replacing a tokenized primary account number with the detokenized counterpart prior to the forwarding of the authorization request to an issuing financial institution.

The processing server 102 may also include a transmitting device 220. The transmitting device 220 may be configured to transmit data over one or more networks via one or more network protocols. In some embodiments, the transmitting device 220 may be configured to transmit data to ATMs 106, mobile computing devices 108, payment networks 110, and other entities via one or more networks, such as local area networks, cellular communication networks, the Internet, payment rails, etc. The transmitting device 220 may also be configured to transmit data over specially configured payment rails associated with the payment network 110, which may be specialized infrastructure associated therewith. In some embodiments, the transmitting device 220 may be comprised of multiple devices, such as different transmitting devices for transmitting data over different networks, such as a first transmitting device for transmitting data over the payment rails and a second transmitting device for transmitting data over the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to ATMs 106, which may be superimposed or otherwise encoded with transaction data. The transaction data may include desired transaction details and a tokenized primary account number for inclusion in a related authorization request. The transmitting device 220 may also be configured to electronically transmit transaction messages to payment networks 110 and other entities via the associated payment rails, such as may be transmitted following the swapping of a tokenized primary account number for its detokenized counterpart.

The processing server 102 may also include a memory 222. The memory 222 may be configured to store data for use by the processing server 102 in performing the functions discussed herein. The memory 222 may be configured to store data using suitable data formatting methods and schema and may be any suitable type of memory, such as read-only memory, random access memory, etc. The memory 222 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 222 may be comprised of or may otherwise include a relational database that utilizes structured query language for the storage, identification, modifying, updating, accessing, etc. of structured data sets stored therein.

Mobile Computing Device

Figure 3:
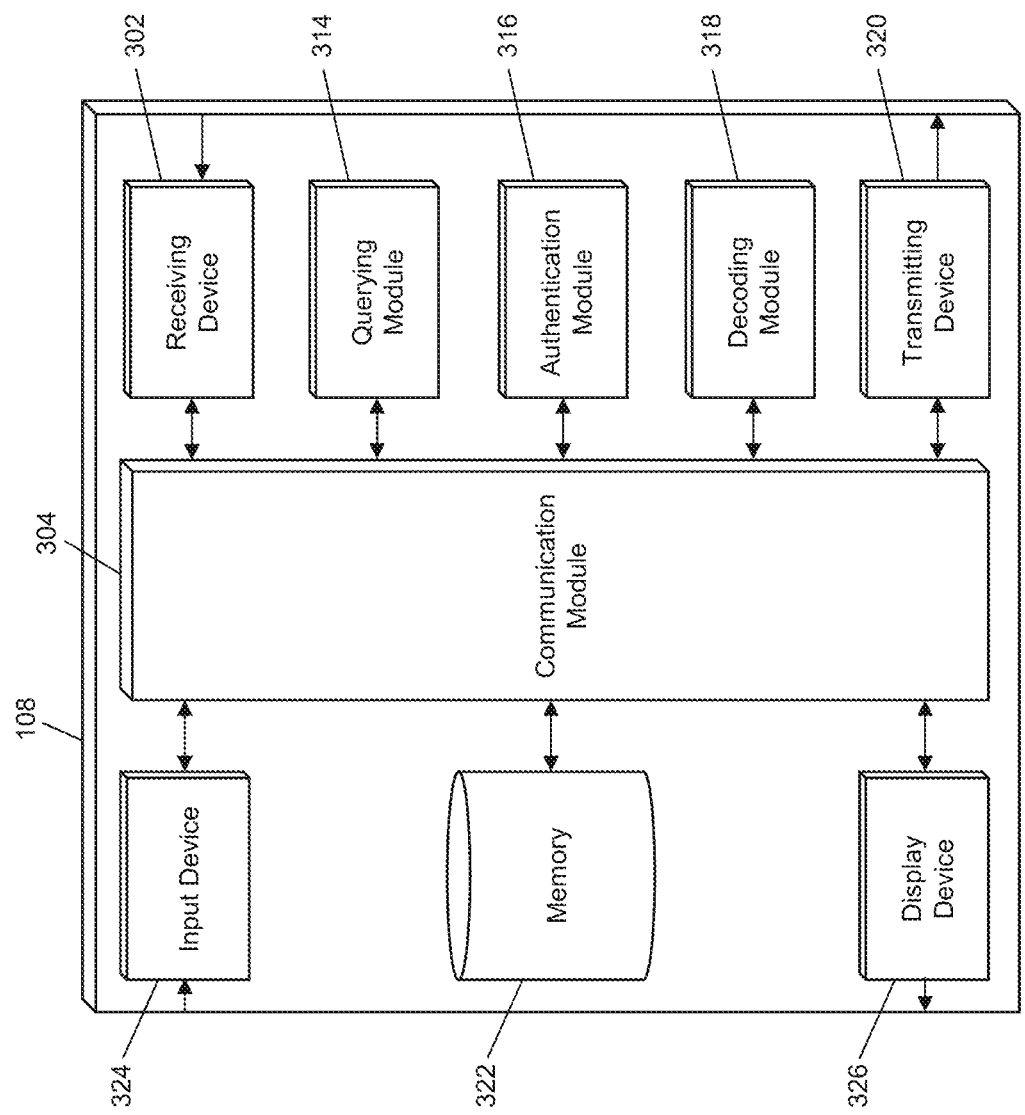
FIG. 3 is a block diagram illustrating the mobile computing device of FIG. 1 for the initiation of a cardless automated teller machine transaction thereby in accordance with exemplary embodiments.

FIG. 3 illustrates an embodiment of a mobile computing device 108 in the system 100. It will be apparent to persons having skill in the relevant art that the embodiment of the mobile computing device 108 illustrated in FIG. 3 is provided as illustration only and may not be exhaustive to all possible configurations of the mobile computing device 108 suitable for performing the functions as discussed herein. For example, the computer system 800 illustrated in FIG. 8 and discussed in more detail below may be a suitable configuration of the mobile computing device 108.

The mobile computing device 108 may include a receiving device 302. The receiving device 302 may be configured to receive data over one or more networks via one or more network protocols. In some embodiments, the receiving device 302 may be configured to receive data from ATMs 106, the processing server 102, and other entities via one or more communication networks, such as local area networks, cellular communication networks, the Internet, etc. In some embodiments, the receiving device 302 may be comprised of multiple devices, such as different receiving devices for receiving data over different networks, such as a first receiving device for receiving data via a local area network and a second receiving device for receiving data over the Internet. The receiving device 302 may receive electronically transmitted data signals, where data may be superimposed or otherwise encoded on the data signal and decoded, parsed, read, or otherwise obtained via receipt of the data signal by the receiving device 302. In some instances, the receiving device 302 may include a parsing module for parsing the received data signal to obtain the data superimposed thereon. For example, the receiving device 302 may include a parser program configured to receive and transform the received data signal into usable input for the functions performed by the processing device to carry out the methods and systems described herein.

The receiving device 302 may be configured to receive data signals electronically transmitted by ATMs 106, which may be superimposed or otherwise encoded with unique identifiers, such as for inclusion in a transaction request. In some instances, the receiving device 302 may also be configured to receive data signals electronically transmitted by the processing server 102, which may be superimposed or otherwise encoded with data for use in registration, requests for authentication data, unique identifier requests, etc.

The mobile computing device 108 may also include a communication module 304. The communication module 304 may be configured to transmit data between modules, engines, databases, memories, and other components of the mobile computing device 108 for use in performing the functions discussed herein. The communication module 304 may be comprised of one or more communication types and utilize various communication methods for communications within a computing device. For example, the communication module 304 may be comprised of a bus, contact pin connectors, wires, etc. In some embodiments, the communication module 304 may also be configured to communicate between internal components of the mobile computing device 108 and external components of the mobile computing device 108, such as externally connected databases, display devices, input devices, etc. The mobile computing device 108 may also include a processing device. The processing device may be configured to perform the functions of the mobile computing device 108 discussed herein as will be apparent to persons having skill in the relevant art. In some embodiments, the processing device may include and/or be comprised of a plurality of engines and/or modules specially configured to perform one or more functions of the processing device, such as a querying module 314, authentication module 316, decoding module 318, etc. As used herein, the term "module" may be software or hardware particularly programmed to receive an input, perform one or more processes using the input, and provide an output. The input, output, and processes performed by various modules will be apparent to one skilled in the art based upon the present disclosure.

The mobile computing device 108 may also include a memory 322. The memory 322 may be configured to store data for use by the mobile computing device 108 in performing the functions discussed herein. The memory 322 may be configured to store data using suitable data formatting methods and schema and may be any suitable type of memory, such as read-only memory, random access memory, etc. The memory 322 may include, for example, encryption keys and algorithms, communication protocols and standards, data formatting standards and protocols, program code for modules and application programs of the processing device, and other data that may be suitable for use by the mobile computing device 108 in the performance of the functions disclosed herein as will be apparent to persons having skill in the relevant art. In some embodiments, the memory 322 may be comprised of or may otherwise include a relational database that utilizes structured query language for the storage, identification, modifying, updating, accessing, etc. of structured data sets stored therein.

The memory 322 may be configured to store at least account identifying information associated with a transaction account and authentication data. The account identifying information may be comprised of an account identifier or other value for use by the processing server 102 in identifying the transaction account intended for use by the consumer 104 as a user of the mobile computing device 108. The authentication data may include data for use by the mobile computing device 108 in authenticating the user when a cardless ATM transaction is requested. In some instances, the memory 322 may also be configured to store a private key, such as for use in generating a digital signature for verification by the processing server 102.

The mobile computing device 108 may include a querying module 314. The querying module 314 may be configured to execute queries on databases to identify information. The querying module 314 may receive one or more data values or query strings, and may execute a query string based thereon on an indicated database, such as the memory 322, to identify information stored therein. The querying module 314 may then output the identified information to an appropriate engine or module of the mobile computing device 108 as necessary. The querying module 314 may, for example, execute a query on the memory 322 to identify the authentication data stored therein for use in authenticating the consumer 104 as a user thereof when a cardless ATM transaction is being requested.

The mobile computing device 108 may also include an authentication module 316. The authentication module 316 may be configured to perform authentications and verifications for the mobile computing device 108 as discussed herein. The authentication module 316 may receive data to be authenticated or verified as input, may perform the authentication or verification, and output a result to another module or engine of the mobile computing device 108. For example, the authentication module 316 may be configured to authenticate the consumer 104 as a user thereof by comparing supplied authentication information with previously stored authentication data. In some embodiments, the authentication module 316 may be configured to generate a digital signature (e.g., using a private key stored in the memory 322) upon successful authentication of the consumer 104.

The mobile computing device 108 may also include a decoding module 318. The decoding module 318 may be configured to decode data for the mobile computing device 108 as part of the functions discussed herein. The decoding module 318 may receive data as input, may decode the data to identify data encoded therein, and to output the identified, decoded data to another module or engine of the mobile computing device 108. For example, the decoding module 318 may be configured to decode a machine-readable code displayed by an ATM 106 and read by the mobile computing device 108 to identify a unique identifier encoded therein, such as for inclusion in a transaction request.

The mobile computing device 108 may also include a transmitting device 320. The transmitting device 320 may be configured to transmit data over one or more networks via one or more network protocols. In some embodiments, the transmitting device 320 may be configured to transmit data to ATMs 106, the processing server 102, and other entities via one or more networks, such as local area networks, cellular communication networks, the Internet, etc. In some embodiments, the transmitting device 320 may be comprised of multiple devices, such as different transmitting devices for transmitting data over different networks, such as a first transmitting device for transmitting data over a cellular communication network and a second transmitting device for transmitting data over the Internet. The transmitting device 320 may electronically transmit data signals that have data superimposed that may be parsed by a receiving computing device. In some instances, the transmitting device 320 may include one or more modules for superimposing, encoding, or otherwise formatting data into data signals suitable for transmission.

The transmitting device 320 may be configured to electronically transmit data signals to processing servers 102, which may be superimposed or otherwise encoded with a transaction request. A transaction request may include at least desired transaction details, account identifying information, authentication information and/or a digital signature, and a unique identifier associated with an ATM 106. In some embodiments, the transmitting device 320 may also be configured to electronically transmit data signals to an ATM 106, such as may be superimposed or otherwise encoded with a request for a unique identifier associated therewith.

The mobile computing device 108 may also include or be otherwise be interfaced with one or more input devices 324. The input devices 324 may be internal to the mobile computing device 108 or external to the mobile computing device 108 and connected thereto via one or more connections (e.g., wired or wireless) for the transmission of data to and/or from. The input devices 324 may be configured to receive input from a user of the mobile computing device 108, such as the consumer 104, which may be provided to another module or engine of the mobile computing device 108 (e.g., via the communication module 304) for processing accordingly. Input devices 324 may include any type of input device suitable for receiving input for the performing of the functions discussed herein, such as a keyboard, mouse, click wheel, scroll wheel, microphone, touch screen, track pad, camera, optical imager, etc. The input device 324 may be configured to, for example, receive input from the consumer 104 indicating a desired transaction account and desired transaction details. The input device 324 may also be configured to receive input from the consumer 104 of a unique identifier associated with an ATM 106, or may include an optical imager configured to read a machine-readable code displayed by an ATM 106 and encoded with the unique identifier associated therewith.

The mobile computing device 108 may also include or be otherwise interfaced with a display device 326. The mobile display device 326 may be internal to the mobile computing device 108 or external to the mobile computing device 108 and connected thereto via one or more connections (e.g., wired or wireless) for the transmission of data to and/or from. The display device 326 may be configured to display data to a user of the mobile computing device 108, such as the consumer 104. The display device 326 may be any type of display suitable for displaying data as part of the functions discussed herein, such as a liquid crystal display, light emitting diode display, thin film transistor display, capacitive touch display, cathode ray tube display, light projection display, etc. In some instances, the computing device 108 may include multiple display devices 326. The display device 326 may be configured to, for example, display a user interface to the consumer 104 for the input of desired transaction details, selection of a desired transaction account, input of a unique identifier, reading of a machine-readable code, or for other interaction with the consumer 104 for performing the functions discussed herein.

Processing of a Cardless ATM Transaction

Figure 4:
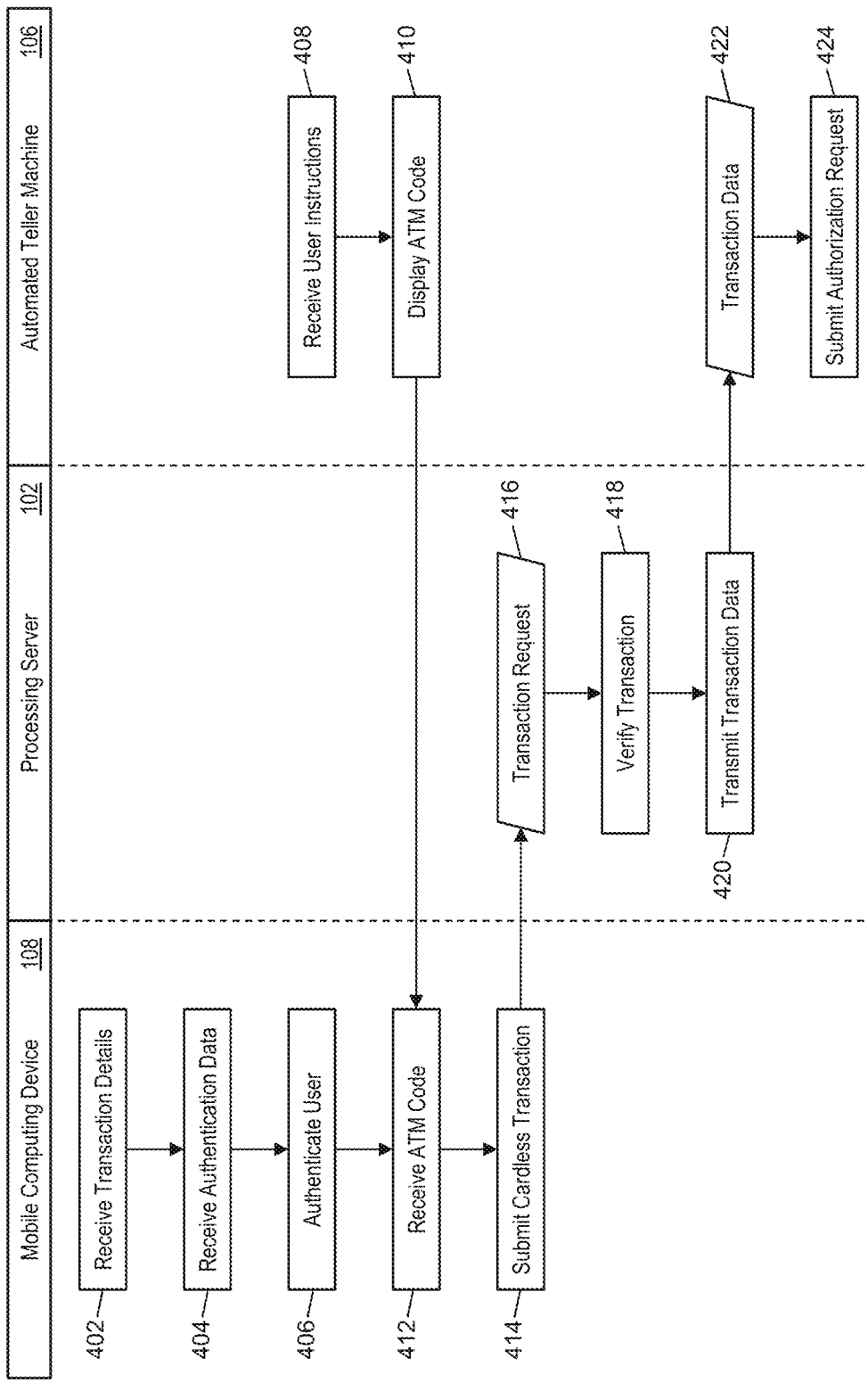
FIG. 4 is a flow diagram illustrating a process for the initiation of a cardless transaction at an automated teller machine using the system of FIG. 1 in accordance with exemplary embodiments.

FIG. 4 illustrates a process for the initiation of a cardless ATM transaction at the ATM 106 initiated by the mobile computing device 108 using the processing server 102 as part of the system 100.

In step 402, the input device 324 of the mobile computing device 108 may receive desired transaction details for a cardless ATM transaction desired by the consumer 104 as a user of the mobile computing device 108. The desired transaction details may include, for example, a type of transaction (e.g., withdrawal, deposit, inquiry, etc.), transaction amount, currency type, etc. Step 402 may also include the receipt of an indication of the transaction account to be used for the transaction by the input device 324. In step 404, the input device 324 of the mobile computing device 108 may also receive authentication data supplied by the consumer 104 as the user of the mobile computing device 108. Authentication data may include, for example, a username, password, personal identification number, fingerprint scan, retinal scan, voice command, facial scan, etc. In step 406, the authentication module 316 of the mobile computing device 108 may authenticate the consumer 104 as the user of the mobile computing device 108 by comparing the supplied authentication data to authentication information stored in the memory 322 of the mobile computing device 108. In some embodiments, the authentication module 316 may generate a digital signature (e.g., using a private key stored in the memory 322) upon successful authentication. In some cases, the mobile computing device 108 may be configured to perform authentication using a third party computing system, such as the processing server 102 or another suitable service. For instance, the mobile computing device 108 may electronically transmit the supplied authentication data to the third party, which may perform the authentication, and provide a result back to the mobile computing device 108 for use thereby (e.g., to proceed if the authentication was successful). In some instances, the ATM 106 may be used in the authentication, such as by personal identification number using traditional methods.

In step 408, an ATM 106 may receive user instructions (e.g., from the consumer 104) using an interface thereof requesting a unique identifier for use in initiating a cardless ATM transaction at the ATM 106. In step 410, the ATM 106 may display, or otherwise output, a unique identifier associated with the ATM 106. For instance, the ATM 106 may display a machine-readable code encoded with the unique identifier, may display the unique identifier itself, may audibly emit the unique identifier, electronically transmit the unique identifier to the mobile computing device 108 via near field communication, etc. In some embodiments, the unique identifier may be generated by the ATM 106 following the receipt of the instruction in step 408. In such embodiments, the ATM 106 may be configured to electronically transmit the unique identifier to the processing server 102 in addition to displaying the machine-readable code to the consumer 104.

In step 412, the input device 324 of the mobile computing device 108 may receive the unique identifier associated with the ATM 106. In some embodiments, the unique identifier may be manually input by the consumer 104 using the input device 324, such as a keyboard, touch screen, microphone, etc. In other embodiments, the unique identifier may be read by an optical imager as the input device 324 of the mobile computing device 108. In such instances, if the unique identifier is encoded in a machine-readable code or other representation of data, the decoding module 318 of the mobile computing device 108 may decode the representation to identify the unique identifier.

In step 414, the transmitting device 320 of the mobile computing device 108 may electronically transmit a transaction request for the cardless ATM transaction to the processing server 102 using a first communication channel. In step 416, the receiving device 202 of the processing server 102 may receive the transaction request. The transaction request may include at least the desired transaction details, account identifying information, unique identifier, and a result of the authentication performed by the authentication module 316 of the mobile computing device 108, which may include, for example, a digital signature generated thereby. In step 418, the authentication module 216 of the processing server 102 may verify the transaction. Verification of the transaction may include verifying result of the authentication (e.g., verifying the digital signature using a public key stored in an account profile 212 in the account database 210 of the processing server 102 identified using the account identifying information), as well as verification that the unique identifier is associated with the desired ATM 106, such as based on inclusion of the unique identifier in an ATM profile 208 of the ATM database 206 of the processing server 102 related thereto. In instances where the account profile 212 for the identified transaction account does not include an already tokenized primary account number, step 418 may include the tokenization of the primary account number stored therein by the transaction processing module 218 of the processing server 102.

In step 420, the transmitting device 220 of the processing server 102 may electronically transmit transaction data for the cardless ATM transaction to the ATM 106 using a second communication channel. In some embodiments, the second communication channel may use the same communication method as the first communication channel. In an exemplary embodiment, the second communication channel may not use the payment rails or other communication method used by the ATM 106 to communicate with a payment network 110. In step 422, the ATM 106 may receive the transaction data, which may include the desired transaction details and tokenized primary account number. In step 424, the ATM 106 may submit an authorization request to the payment network 110 for processing of the cardless ATM transaction, where the authorization request includes data elements configured to store the tokenized primary account number and desired transaction details. The payment network 110 may then process the authorization request using traditional methods, which may also include the swapping of the tokenized primary account number for its detokenized counterpart by the processing server 102, as discussed above.

Figure 5:
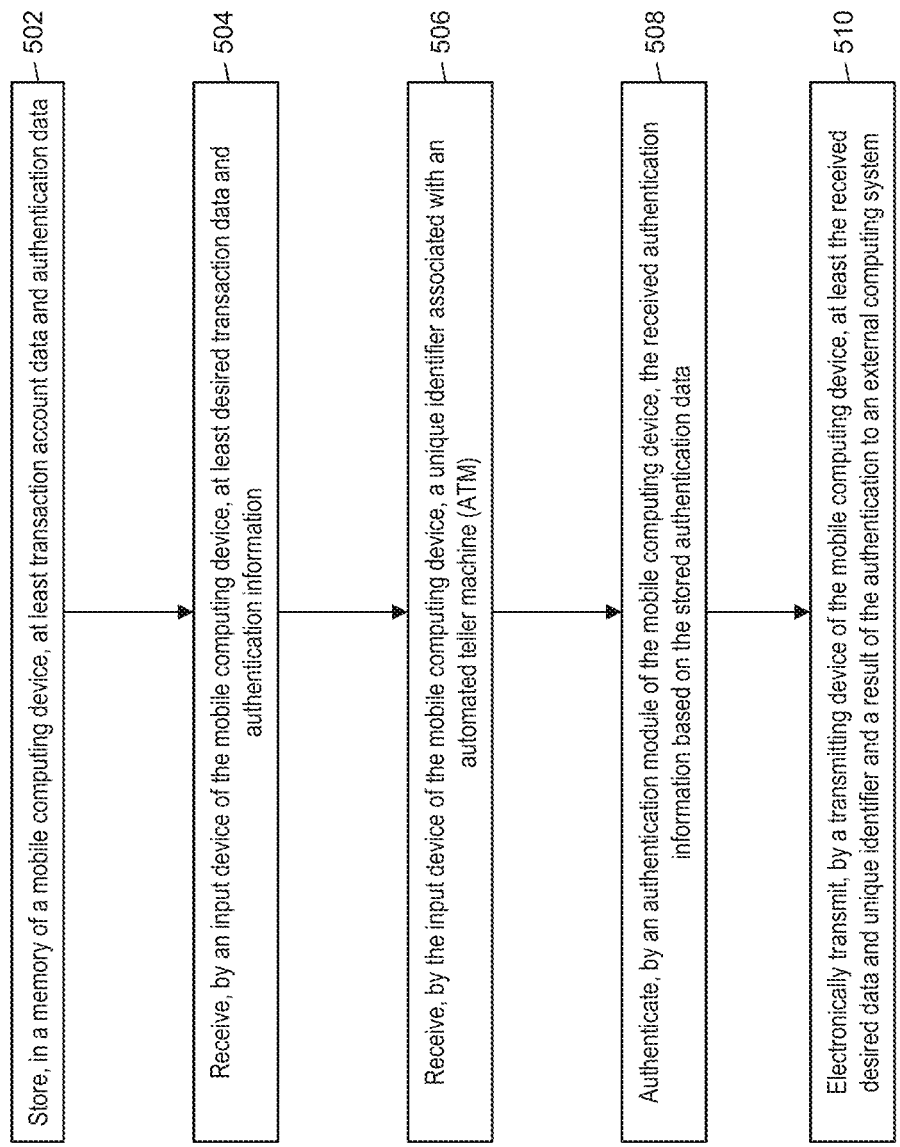
FIG. 5 is a flow chart illustrating an exemplary method for initiating a cardless automated teller machine transaction via a mobile computing device in accordance with exemplary embodiments.

Exemplary Method for Initiating a Cardless ATM Transaction via a Mobile Computing Device FIG. 5 illustrates a process 500 for the initiation of a cardless automated teller machine transaction via the use of a mobile computing device.

In step 502, at least transaction account data and authentication data may be stored in a memory (e.g., the memory 322) of a mobile computing device (e.g., the mobile computing device 108). In step 504, at least desired transaction data and authentication information may be received by an input device (e.g., the input device 324) of the mobile computing device. In step 506, a unique identifier associated with an automated teller machine (ATM) may be received by the input device of the mobile computing device.

In step 508, the received authentication information may be authenticated by an authentication module (e.g., the authentication module 316) of the mobile computing device based on the stored authentication data. In step 510, at least the received desired transaction data and unique identifier and a result of the authentication may be electronically transmitted by a transmitting device (e.g., the transmitting device 320) of the mobile computing device to an external computing system (e.g., the processing server 102).

In one embodiment, the transaction account data may comprise a digital token associated with a transaction account authorized for ATM withdrawal. In some embodiments, the result of the authentication may be a digital signature generated by the authentication module representing successful authentication. In one embodiment, the desired transaction data and authentication information may be received via a first input device, and the unique identifier may be received via a second input device. In a further embodiment the second input device may be an optical imager, and receipt of the unique identifier may comprise: reading, by the optical imager of the mobile computing device, a machine-readable code displayed by the ATM, and decoding, by a decoding module (e.g., the decoding module 318) of the mobile computing device, the machine-readable code to identify the unique identifier.

Figure 6:
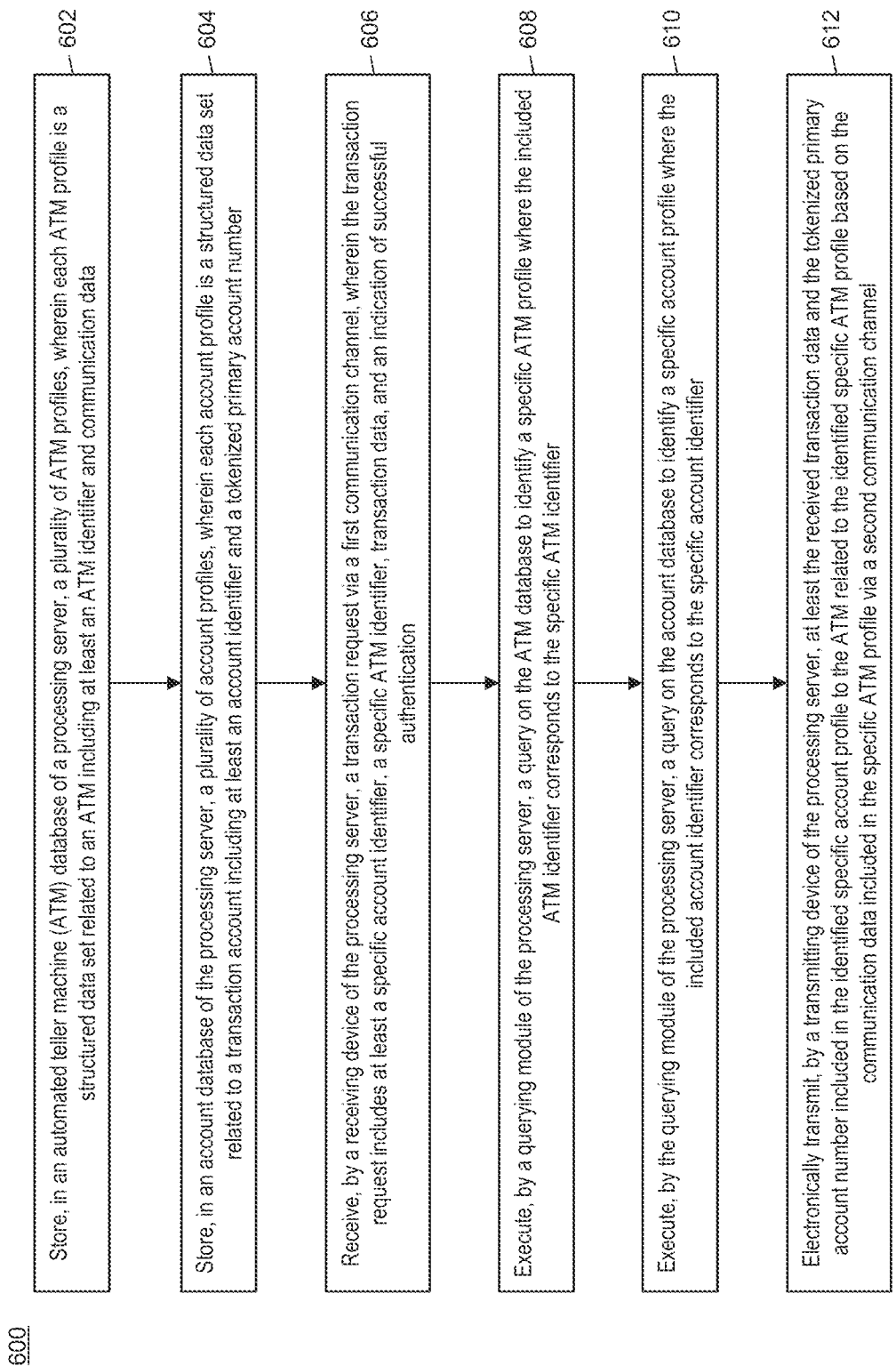
FIG. 6 is a flow chart illustrating an exemplary method for processing a cardless automated teller machine transaction initiated by a mobile computing device in accordance with exemplary embodiments.

Exemplary Method for Processing a Cardless ATM Transaction Initiated by a Mobile Computing Device FIG. 6 illustrates a method 600 for the processing of a cardless automated teller machine transaction that utilizes multiple communication channels of the automated teller machine and is initiated by a mobile computing device.

In step 602, a plurality of automated teller machine (ATM) profiles (e.g., ATM profiles 208) may be stored in an ATM database (e.g., the ATM database 206) of the processing server 102, wherein each ATM profile is a structured data set related to an ATM (e.g., the ATM 106) including at least an ATM identifier and communication data. In step 604, a plurality of account profiles (e.g., account profiles 212) may be stored in an account database (e.g., the account database 210) of the processing server, wherein each account profile is a structured data set related to a transaction account including at least an account identifier and a tokenized primary account number.

In step 606, a transaction request may be received by a receiving device (e.g., the receiving device 202) of the processing server via a first communication channel, wherein the transaction request includes at least a specific account identifier, a specific ATM identifier, transaction data, and an indication of successful authentication. In step 608, a query may be executed on the ATM database by a querying module (e.g., the querying module 214) of the processing server to identify a specific ATM profile where the included ATM identifier corresponds to the specific ATM identifier.

In step 610, a query may be executed on the account database by the querying module of the processing server to identify a specific account profile where the included account identifier corresponds to the specific account identifier. In step 612, at least the received transaction data and the tokenized primary account number included in the identified specific account profile may be electronically transmitted by a transmitting device (e.g., the transmitting device 220) of the processing server to the ATM related to the identified specific ATM profile based on the communication data included in the specific ATM profile via a second communication channel.

In one embodiment, the method 600 may further include: receiving, by the receiving device of the processing server, a transaction message for a payment transaction, wherein the authorization request is received via a third communication channel, is formatted based on one or more standards, and includes a plurality of data elements including at least a first data element configured to store the tokenized primary account number and one or more additional data elements configured to store the received transaction data; and forwarding, by the transmitting device of the processing server, the received transaction message to a financial institution associated with the transaction account related to the specific account profile via the third communication channel. In a further embodiment, the method 600 may even further include: detokenizing, by a transaction processing module (e.g., the transaction processing module 218) of the processing server, the tokenized primary account number stored in the first data element included in the received transaction message; and replacing, by the transaction processing module of the processing server, the tokenized primary account number with the detokenized primary account number in the first data element included in the received transaction message prior to forwarding the transaction message.

In some embodiments, the transaction request may be received from a mobile computing device (e.g., the mobile computing device 108), and the indication of successful authentication may be a digital signature generated by the mobile computing device upon completion of a successful authentication on the mobile computing device. In one embodiment, the transaction request may further include a unique identifier and the method 600 may also include: receiving, by the receiving device of the processing server, validation data from the ATM related to the identified specific ATM profile via the second communication channel, wherein the validation data includes at least a unique value; and authenticating, by an authentication module (e.g., the authentication module 216) of the processing server, the unique identifier based on the received unique value, where transmitting at least the received transaction data and the tokenized primary account number included in the identified specific account profile to the ATM related to the identified specific ATM profile further includes electronically transmitting a result of the authentication.

Payment Transaction Processing System and Process

Figure 7:
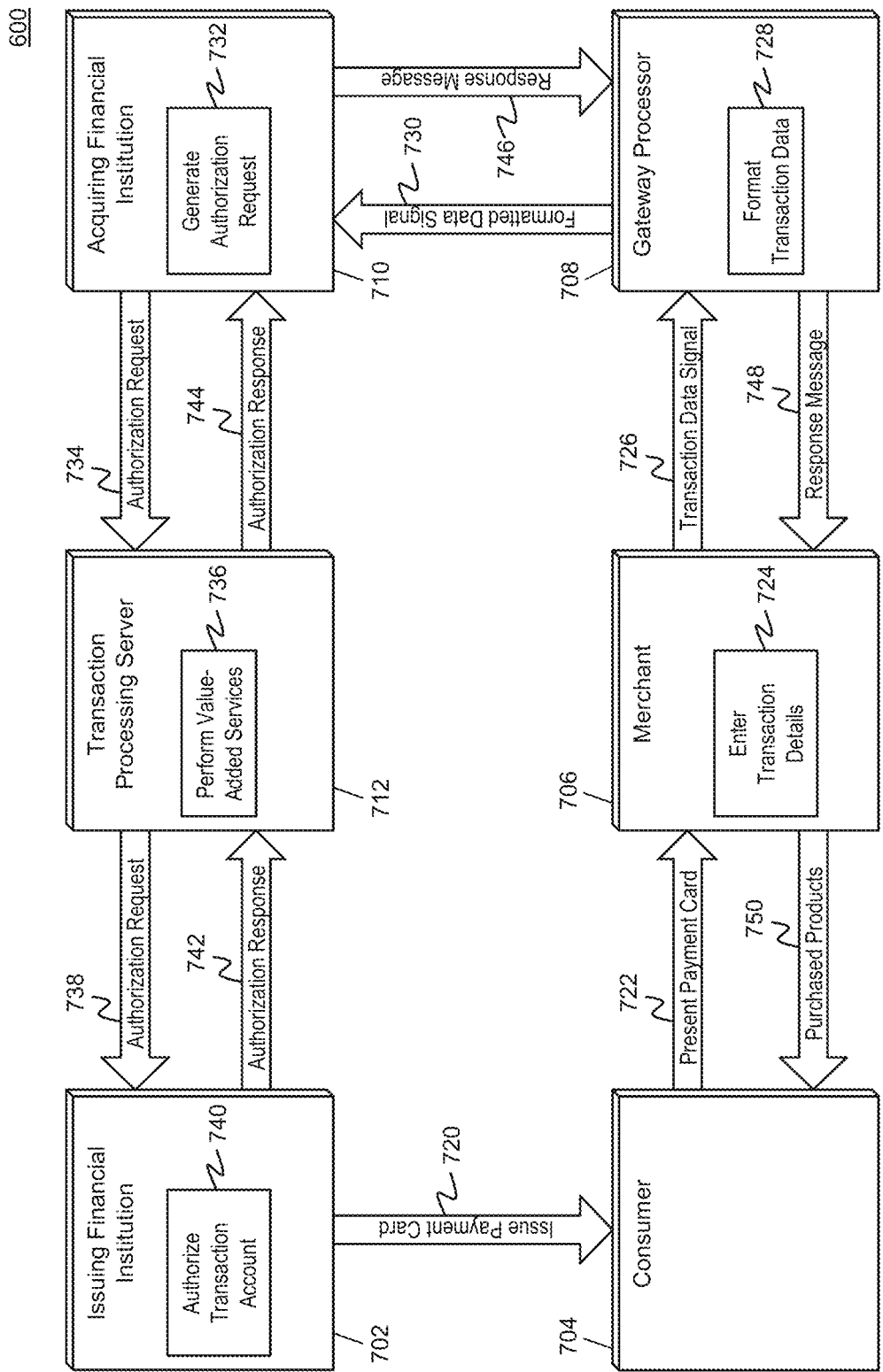
FIG. 7 is a flow diagram illustrating the processing of a payment transaction in accordance with exemplary embodiments.

FIG. 7 illustrates a transaction processing system and a process 700 for the processing of payment transactions in the system, which may include the processing of thousands, millions, or even billions of transactions during a given period (e.g., hourly, daily, weekly, etc.). The process 700 and steps included therein may be performed by one or more components of the system 100 discussed above, such as the processing server 102, consumer 104, ATM 106, payment network 110, etc. The processing of payment transactions using the system and process 700 illustrated in FIG. 7 and discussed below may utilize the payment rails, which may be comprised of the computing devices and infrastructure utilized to perform the steps of the process 700 as specially configured and programmed by the entities discussed below, including the transaction processing server 712, which may be associated with one or more payment networks configured to processing payment transactions. It will be apparent to persons having skill in the relevant art that the process 700 may be incorporated into the processes illustrated in FIGS. 4-6, discussed above, with respect to the step or steps involved in the processing of a payment transaction. In addition, the entities discussed herein for performing the process 700 may include one or more computing devices or systems configured to perform the functions discussed below. For instance, the merchant 706 may be comprised of one or more point of sale devices, a local communication network, a computing server, and other devices configured to perform the functions discussed below.

In step 720, an issuing financial institution 702 may issue a payment card or other suitable payment instrument to a consumer 704. The issuing financial institution may be a financial institution, such as a bank, or other suitable type of entity that administers and manages payment accounts and/or payment instruments for use with payment accounts that can be used to fund payment transactions. The consumer 704 may have a transaction account with the issuing financial institution 702 for which the issued payment card is associated, such that, when used in a payment transaction, the payment transaction is funded by the associated transaction account. In some embodiments, the payment card may be issued to the consumer 704 physically. In other embodiments, the payment card may be a virtual payment card or otherwise provisioned to the consumer 704 in an electronic format.

In step 722, the consumer 704 may present the issued payment card to a merchant 706 for use in funding a payment transaction. The merchant 706 may be a business, another consumer, or any entity that may engage in a payment transaction with the consumer 704. The payment card may be presented by the consumer 704 via providing the physical card to the merchant 706, electronically transmitting (e.g., via near field communication, wireless transmission, or other suitable electronic transmission type and protocol) payment details for the payment card, or initiating transmission of payment details to the merchant 706 via a third party. The merchant 706 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 724, the merchant 706 may enter transaction details into a point of sale computing system. The transaction details may include the payment details provided by the consumer 704 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 706 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 706 may be an online retailer in an e-commerce transaction. In such embodiments, the transaction details may be entered in a shopping cart or other repository for storing transaction data in an electronic transaction as will be apparent to persons having skill in the relevant art.

In step 726, the merchant 706 may electronically transmit a data signal superimposed with transaction data to a gateway processor 708. The gateway processor 708 may be an entity configured to receive transaction details from a merchant 706 for formatting and transmission to an acquiring financial institution 710. In some instances, a gateway processor 708 may be associated with a plurality of merchants 706 and a plurality of acquiring financial institutions 710. In such instances, the gateway processor 708 may receive transaction details for a plurality of different transactions involving various merchants, which may be forwarded on to appropriate acquiring financial institutions 710. By having relationships with multiple acquiring financial institutions 710 and having the requisite infrastructure to communicate with financial institutions using the payment rails, such as using application programming interfaces associated with the gateway processor 708 or financial institutions used for the submission, receipt, and retrieval of data, a gateway processor 708 may act as an intermediary for a merchant 706 to be able to conduct payment transactions via a single communication channel and format with the gateway processor 708, without having to maintain relationships with multiple acquiring financial institutions 710 and payment processors and the hardware associated thereto. Acquiring financial institutions 710 may be financial institutions, such as banks, or other entities that administers and manages payment accounts and/or payment instruments for use with payment accounts. In some instances, acquiring financial institutions 710 may manage transaction accounts for merchants 706. In some cases, a single financial institution may operate as both an issuing financial institution 702 and an acquiring financial institution 710.

The data signal transmitted from the merchant 706 to the gateway processor 708 may be superimposed with the transaction details for the payment transaction, which may be formatted based on one or more standards. In some embodiments, the standards may be set forth by the gateway processor 708, which may use a unique, proprietary format for the transmission of transaction data to/from the gateway processor 708. In other embodiments, a public standard may be used, such as the International Organization for Standardization's ISO 8583 standard. The standard may indicate the types of data that may be included, the formatting of the data, how the data is to be stored and transmitted, and other criteria for the transmission of the transaction data to the gateway processor 708.

In step 728, the gateway processor 708 may parse the transaction data signal to obtain the transaction data superimposed thereon and may format the transaction data as necessary. The formatting of the transaction data may be performed by the gateway processor 708 based on the proprietary standards of the gateway processor 708 or an acquiring financial institution 710 associated with the payment transaction. The proprietary standards may specify the type of data included in the transaction data and the format for storage and transmission of the data. The acquiring financial institution 710 may be identified by the gateway processor 708 using the transaction data, such as by parsing the transaction data (e.g., deconstructing into data elements) to obtain an account identifier included therein associated with the acquiring financial institution 710. In some instances, the gateway processor 708 may then format the transaction data based on the identified acquiring financial institution 710, such as to comply with standards of formatting specified by the acquiring financial institution 710. In some embodiments, the identified acquiring financial institution 710 may be associated with the merchant 706 involved in the payment transaction, and, in some cases, may manage a transaction account associated with the merchant 706.

In step 730, the gateway processor 708 may electronically transmit a data signal superimposed with the formatted transaction data to the identified acquiring financial institution 710. The acquiring financial institution 710 may receive the data signal and parse the signal to obtain the formatted transaction data superimposed thereon. In step 732, the acquiring financial institution may generate an authorization request for the payment transaction based on the formatted transaction data. The authorization request may be a specially formatted transaction message that is formatted pursuant to one or more standards, such as the ISO 8583 standard and standards set forth by a payment processor used to process the payment transaction, such as a payment network. The authorization request may be a transaction message that includes a message type indicator indicative of an authorization request, which may indicate that the merchant 706 involved in the payment transaction is requesting payment or a promise of payment from the issuing financial institution 702 for the transaction. The authorization request may include a plurality of data elements, each data element being configured to store data as set forth in the associated standards, such as for storing an account number, application cryptogram, transaction amount, issuing financial institution 702 information, etc.

In step 734, the acquiring financial institution 710 may electronically transmit the authorization request to a transaction processing server 712 for processing. The transaction processing server 712 may be comprised of one or more computing devices as part of a payment network configured to process payment transactions. In some embodiments, the authorization request may be transmitted by a transaction processor at the acquiring financial institution 710 or other entity associated with the acquiring financial institution. The transaction processor may be one or more computing devices that include a plurality of communication channels for communication with the transaction processing server 712 for the transmission of transaction messages and other data to and from the transaction processing server 712. In some embodiments, the payment network associated with the transaction processing server 712 may own or operate each transaction processor such that the payment network may maintain control over the communication of transaction messages to and from the transaction processing server 712 for network and informational security.

In step 736, the transaction processing server 712 may perform value-added services for the payment transaction. Value-added services may be services specified by the issuing financial institution 702 that may provide additional value to the issuing financial institution 702 or the consumer 704 in the processing of payment transactions. Value-added services may include, for example, fraud scoring, transaction or account controls, account number mapping, offer redemption, loyalty processing, etc. For instance, when the transaction processing server 712 receives the transaction, a fraud score for the transaction may be calculated based on the data included therein and one or more fraud scoring algorithms and/or engines. In some instances, the transaction processing server 712 may first identify the issuing financial institution 702 associated with the transaction, and then identify any services indicated by the issuing financial institution 702 to be performed. The issuing financial institution 702 may be identified, for example, by data included in a specific data element included in the authorization request, such as an issuer identification number. In another example, the issuing financial institution 702 may be identified by the primary account number stored in the authorization request, such as by using a portion of the primary account number (e.g., a bank identification number) for identification.

In step 738, the transaction processing server 712 may electronically transmit the authorization request to the issuing financial institution 702. In some instances, the authorization request may be modified, or additional data included in or transmitted accompanying the authorization request as a result of the performance of value-added services by the transaction processing server 712. In some embodiments, the authorization request may be transmitted to a transaction processor (e.g., owned or operated by the transaction processing server 712) situated at the issuing financial institution 702 or an entity associated thereof, which may forward the authorization request to the issuing financial institution 702.

In step 740, the issuing financial institution 702 may authorize the transaction account for payment of the payment transaction. The authorization may be based on an available credit amount for the transaction account and the transaction amount for the payment transaction, fraud scores provided by the transaction processing server 712, and other considerations that will be apparent to persons having skill in the relevant art. The issuing financial institution 702 may modify the authorization request to include a response code indicating approval (e.g., or denial if the transaction is to be denied) of the payment transaction. The issuing financial institution 702 may also modify a message type indicator for the transaction message to indicate that the transaction message is changed to be an authorization response. In step 742, the issuing financial institution 702 may transmit (e.g., via a transaction processor) the authorization response to the transaction processing server 712.

In step 744, the transaction processing server 712 may forward the authorization response to the acquiring financial institution 710 (e.g., via a transaction processor). In step 746, the acquiring financial institution may generate a response message indicating approval or denial of the payment transaction as indicated in the response code of the authorization response, and may transmit the response message to the gateway processor 708 using the standards and protocols set forth by the gateway processor 708. In step 748, the gateway processor 708 may forward the response message to the merchant 706 using the appropriate standards and protocols. In step 750, assuming the transaction was approved, the merchant 706 may then provide the products purchased by the consumer 704 as part of the payment transaction to the consumer 704.

In some embodiments, once the process 700 has completed, payment from the issuing financial institution 702 to the acquiring financial institution 710 may be performed. In some instances, the payment may be made immediately or within one business day. In other instances, the payment may be made after a period of time, and in response to the submission of a clearing request from the acquiring financial institution 710 to the issuing financial institution 702 via the transaction processing server 712. In such instances, clearing requests for multiple payment transactions may be aggregated into a single clearing request, which may be used by the transaction processing server 712 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 740), the transaction processing server 712 may be configured to perform authorization of transactions on behalf of the issuing financial institution 702. Such actions may be referred to as "stand-in processing," where the transaction processing server "stands in" as the issuing financial institution 702. In such instances, the transaction processing server 712 may utilize rules set forth by the issuing financial institution 702 to determine approval or denial of the payment transaction, and may modify the transaction message accordingly prior to forwarding to the acquiring financial institution 710 in step 744. The transaction processing server 712 may retain data associated with transactions for which the transaction processing server 712 stands in, and may transmit the retained data to the issuing financial institution 702 once communication is reestablished. The issuing financial institution 702 may then process transaction accounts accordingly to accommodate for the time of lost communication.

In another example, if the transaction processing server 712 is unavailable for submission of the authorization request by the acquiring financial institution 710, then the transaction processor at the acquiring financial institution 710 may be configured to perform the processing of the transaction processing server 712 and the issuing financial institution 702. The transaction processor may include rules and data suitable for use in making a determination of approval or denial of the payment transaction based on the data included therein. For instance, the issuing financial institution 702 and/or transaction processing server 712 may set limits on transaction type, transaction amount, etc. that may be stored in the transaction processor and used to determine approval or denial of a payment transaction based thereon. In such instances, the acquiring financial institution 710 may receive an authorization response for the payment transaction even if the transaction processing server 712 is unavailable, ensuring that transactions are processed and no downtime is experienced even in instances where communication is unavailable. In such cases, the transaction processor may store transaction details for the payment transactions, which may be transmitted to the transaction processing server 712 (e.g., and from there to the associated issuing financial institutions 702) once communication is reestablished.

In some embodiments, transaction processors may be configured to include a plurality of different communication channels, which may utilize multiple communication cards and/or devices, to communicate with the transaction processing server 712 for the sending and receiving of transaction messages. For example, a transaction processor may be comprised of multiple computing devices, each having multiple communication ports that are connected to the transaction processing server 712. In such embodiments, the transaction processor may cycle through the communication channels when transmitting transaction messages to the transaction processing server 712, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 710 may identify that an authorization request involves an issuing financial institution 702 (e.g., via the bank identification number included in the transaction message) for which no value-added services are required. The transaction processor at the acquiring financial institution 710 may then transmit the authorization request directly to the transaction processor at the issuing financial institution 702 (e.g., without the authorization request passing through the transaction processing server 712), where the issuing financial institution 702 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 712 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 708, acquiring financial institution 710, etc.) for processing using this advanced network, and to quickly and efficiently receive a response regarding the ability for a consumer 704 to fund the payment transaction.

Computer System Architecture

Figure 8:
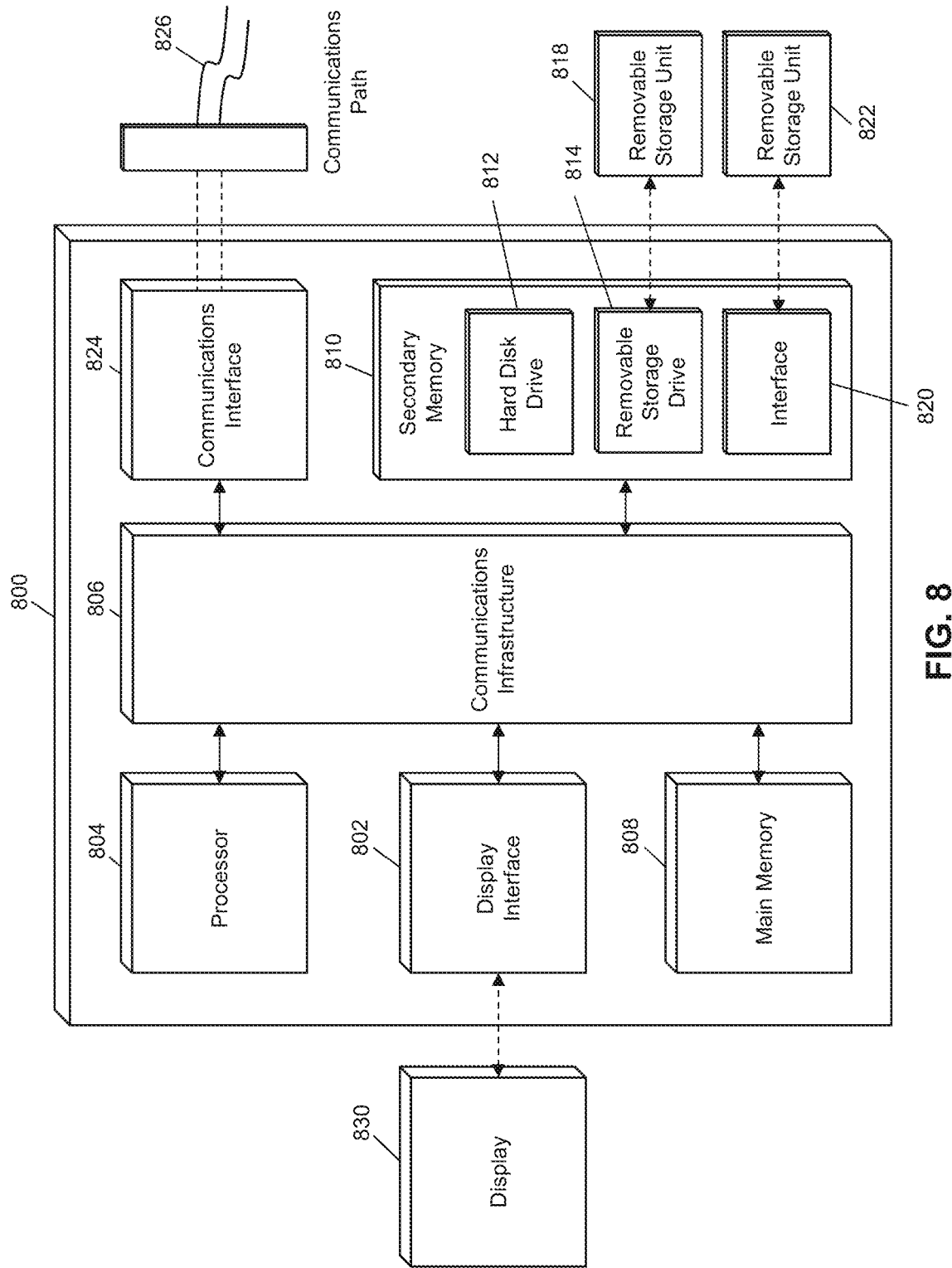
FIG. 8 is a block diagram illustrating a computer system architecture in accordance with exemplary embodiments.

FIG. 8 illustrates a computer system 800 in which embodiments of the present disclosure, or portions thereof, may be implemented as computer-readable code. For example, the processing server 102 and mobile computing device 108 of FIG. 1 may be implemented in the computer system 800 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 4-7.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 818, a removable storage unit 822, and a hard disk installed in hard disk drive 812.

Various embodiments of the present disclosure are described in terms of this example computer system 800. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device specifically configured to perform the functions discussed herein. The processor device 804 may be connected to a communications infrastructure 806, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 800 may also include a main memory 808 (e.g., random access memory, read-only memory, etc.), and may also include a secondary memory 810. The secondary memory 810 may include the hard disk drive 812 and a removable storage drive 814, such as a floppy disk drive, a magnetic tape drive, an optical disk drive, a flash memory, etc.

The removable storage drive 814 may read from and/or write to the removable storage unit 818 in a well-known manner. The removable storage unit 818 may include a removable storage media that may be read by and written to by the removable storage drive 814. For example, if the removable storage drive 814 is a floppy disk drive or universal serial bus port, the removable storage unit 818 may be a floppy disk or portable flash drive, respectively. In one embodiment, the removable storage unit 818 may be non-transitory computer readable recording media.

In some embodiments, the secondary memory 810 may include alternative means for allowing computer programs or other instructions to be loaded into the computer system 800, for example, the removable storage unit 822 and an interface 820. Examples of such means may include a program cartridge and cartridge interface (e.g., as found in video game systems), a removable memory chip (e.g., EEPROM, PROM, etc.) and associated socket, and other removable storage units 822 and interfaces 820 as will be apparent to persons having skill in the relevant art.

Data stored in the computer system 800 (e.g., in the main memory 808 and/or the secondary memory 810) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 800 may also include a communications interface 824. The communications interface 824 may be configured to allow software and data to be transferred between the computer system 800 and external devices. Exemplary communications interfaces 824 may include a modem, a network interface (e.g., an Ethernet card), a communications port, a PCMCIA slot and card, etc. Software and data transferred via the communications interface 824 may be in the form of signals, which may be electronic, electromagnetic, optical, or other signals as will be apparent to persons having skill in the relevant art. The signals may travel via a communications path 826, which may be configured to carry the signals and may be implemented using wire, cable, fiber optics, a phone line, a cellular phone link, a radio frequency link, etc.

The computer system 800 may further include a display interface 802. The display interface 802 may be configured to allow data to be transferred between the computer system 800 and external display 830. Exemplary display interfaces 802 may include high-definition multimedia interface (HDMI), digital visual interface (DVI), video graphics array (VGA), etc. The display 830 may be any suitable type of display for displaying data transmitted via the display interface 802 of the computer system 800, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 808 and secondary memory 810, which may be memory semiconductors (e.g., DRAMs, etc.). These computer program products may be means for providing software to the computer system 800. Computer programs (e.g., computer control logic) may be stored in the main memory 808 and/or the secondary memory 810. Computer programs may also be received via the communications interface 824. Such computer programs, when executed, may enable computer system 800 to implement the present methods as discussed herein. In particular, the computer programs, when executed, may enable processor device 804 to implement the methods illustrated by FIGS. 4-7, as discussed herein. Accordingly, such computer programs may represent controllers of the computer system 800. Where the present disclosure is implemented using software, the software may be stored in a computer program product and loaded into the computer system 800 using the removable storage drive 814, interface 820, and hard disk drive 812, or communications interface 824.

The processor device 804 may comprise one or more modules or engines configured to perform the functions of the computer system 800. Each of the modules or engines may be implemented using hardware and, in some instances, may also utilize software, such as corresponding to program code and/or programs stored in the main memory 808 or secondary memory 810. In such instances, program code may be compiled by the processor device 804 (e.g., by a compiling module or engine) prior to execution by the hardware of the computer system 800. For example, the program code may be source code written in a programming language that is translated into a lower level language, such as assembly language or machine code, for execution by the processor device 804 and/or any additional hardware components of the computer system 800. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 800 to perform the functions disclosed herein. It will be apparent to persons having skill in the relevant art that such processes result in the computer system 800 being a specially configured computer system 800 uniquely programmed to perform the functions discussed above.

Techniques consistent with the present disclosure provide, among other features, systems and methods for initiating and processing cardless automated teller machine transactions initiated via mobile computing devices. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for processing a cardless automated teller machine (ATM) transaction initiated by a mobile computing device, comprising:
    storing, in an automated teller machine (ATM) database of a processing server, a plurality of ATM profiles, wherein each ATM profile is a structured data set related to an ATM including at least a unique identifier associated with the ATM and communication data;
    storing, in an account database of the processing server, a plurality of account profiles, wherein each account profile is a structured data set related to a transaction account including at least an account identifier and a tokenized primary account number;
    receiving, by a receiving device of the processing server from the mobile computing device, a transaction request via a first communication channel, wherein the transaction request includes at least a specific account identifier of a user, a unique identifier received from a specific automated teller machine (ATM) via near field communication, transaction data, and an indication of successful authentication of the user by the mobile computing device, the transaction data including one or more ATM transaction selections, the ATM transaction selections including at least one of: a withdrawal of funds, a deposit of funds, a transaction account balance inquiry, a currency type, and a currency denomination;
    receiving, by a receiving device of the processing server from the specific ATM, the unique identifier associated with the specific ATM via a second communication channel;
    executing, by a querying module of the processing server, a query on the ATM database to identify a specific ATM profile where the included unique identifier corresponds to the specific ATM;
    verifying, by an authentication module of the processing server, the unique identifier received from the mobile computing device based on the unique identifier received from the specific ATM;
    executing, by the querying module of the processing server, a query on the account database to identify a specific account profile where the included account identifier corresponds to the specific account identifier; and
    processing the requested transaction by electronically transmitting, by a transmitting device of the processing server, at least the received transaction data and the tokenized primary account number included in the identified specific account profile to the ATM related to the identified specific ATM profile based on the communication data included in the specific ATM profile via the second communication channel.

2. The method of claim 1, further comprising:
    receiving, by the receiving device of the processing server, a transaction message for a payment transaction from the specific ATM, wherein the transaction message is an authorization request received via a third communication channel, is formatted based on one or more standards, and includes a plurality of data elements including at least a first data element configured to store the tokenized primary account number and one or more additional data elements configured to store the received transaction data; and
    forwarding, by the transmitting device of the processing server, the received transaction message to a financial institution associated with the transaction account related to the specific account profile via the third communication channel.

3. The method of claim 2, further comprising:
    detokenizing, by a transaction processing module of the processing server, the tokenized primary account number stored in the first data element included in the received transaction message; and
    replacing, by the transaction processing module of the processing server, the tokenized primary account number with the detokenized primary account number in the first data element included in the received transaction message prior to forwarding the transaction message.

4. The method of claim 1, wherein the transmitting at least the received transaction data and the tokenized primary account number included in the identified specific account profile to the ATM related to the identified specific ATM profile further includes electronically transmitting a result of the verification.

5. A system for processing a cardless automated teller machine (ATM) transaction initiated by a mobile computing device, comprising:
    an automated teller machine (ATM) database of a processing server configured to store a plurality of ATM profiles, wherein each ATM profile is a structured data set related to an ATM including at least a unique identifier associated with the ATM and communication data;
    an account database of the processing server configured to store a plurality of account profiles, wherein each account profile is a structured data set related to a transaction account including at least an account identifier and a tokenized primary account number;
    a receiving device of the processing server configured to:
        receive, from the mobile computing device, a transaction request via a first communication channel, wherein the transaction request includes at least a specific account identifier of a user, a unique identifier received from a specific automated teller machine (ATM) via near field communication, transaction data, and an indication of successful authentication of the user by the mobile computing device, the transaction data including one or more ATM transaction selections, the ATM transaction selections including at least one of: a withdrawal of funds, a deposit of funds, a transaction account balance inquiry, a currency type, and a currency denomination;

receive, from the specific ATM, the unique identifier associated with the specific ATM via a second communication channel;

a querying module of the processing server configured to execute a query on the ATM database to identify the specific ATM profile where the included unique identifier corresponds to the specific ATM, and a query on the account database to identify a specific account profile where the included account identifier corresponds to the specific account identifier;

an authentication module of the processing server configured to verify the unique identifier received from the mobile computing device based on the unique identifier received from the specific ATM; and a transmitting device of the processing server configured to process the requested transaction by electronically transmitting at least the received transaction data and the tokenized primary account number included in the identified specific account profile to the ATM related to the identified specific ATM profile based on the communication data included in the specific ATM profile via the second communication channel.

6. The system of claim 5, wherein the receiving device of the processing server is further configured to receive a transaction message for a payment transaction from the specific ATM, wherein the transaction message is an authorization request received via a third communication channel, is formatted based on one or more standards, and includes a plurality of data elements including at least a first data element configured to store the tokenized primary account number and one or more additional data elements configured to store the received transaction data, and the transmitting device of the processing server is further configured to forward the received transaction message to a financial institution associated with the transaction account related to the specific account profile via the third communication channel.

7. The system of claim 6, further comprising:

a transaction processing module of the processing server configured to detokenize the tokenized primary account number stored in the first data element included in the received transaction message, and replace the tokenized primary account number with the detokenized primary account number in the first data element included in the received transaction message prior to forwarding the transaction message.

8. The system of claim 5, wherein the transmitting at least the received transaction data and the tokenized primary account number included in the identified specific account profile to the ATM related to the identified specific ATM profile further includes electronically transmitting a result of the verification.

9. The method of claim 1, wherein the transaction request is received from a mobile computing device, and the indication of successful authentication is a digital signature generated by the mobile computing device upon completion of a successful authentication on the mobile computing device.

10. The system of claim 5, wherein the transaction request is received from a mobile computing device, and the indication of successful authentication is a digital signature generated by the mobile computing device upon completion of a successful authentication on the mobile computing device.

* * * * *